(12) United States Patent
Stancovski (10) Patent No.: US 8,511,064 B2
(45) Date of Patent: Aug. 20, 2013

(54) METHODS AND APPARATUS FOR CONTROLLING CATALYTIC PROCESSES, INCLUDING CATALYST REGENERATION AND SOOT ELIMINATION

(75) Inventor: Victor Stancovski, Groton, CT (US)

(73) Assignee: Catelectric Corp., Hartford, CT (US)

( * ) Notice: Subject to any disclaimer, the term of this patent is extended or adjusted under 35 U.S.C. 154(b) by 73 days.

(21) Appl. No.: 13/088,689

(22) Filed: Apr. 18, 2011

(65) Prior Publication Data

US 2011/0192729 A1 Aug. 11, 2011

Related U.S. Application Data

(60) Division of application No. 11/588,113, filed on Oct. 25, 2006, now Pat. No. 7,950,221, which is a continuation-in-part of application No. 10/423,376, filed on Apr. 25, 2003, now Pat. No. 7,325,392.

(60) Provisional application No. 60/731,570, filed on Oct. 28, 2005.

(51) Int. Cl.
*F01N 3/00* (2006.01)

(52) U.S. Cl.
USPC .............. 60/275; 60/274; 60/276; 60/299; 502/182; 502/185; 502/417; 429/482; 429/483; 429/523; 429/532

(58) Field of Classification Search
USPC ............... 60/274, 275, 276, 299; 502/182, 502/185, 416, 417; 429/482, 483, 523, 532
See application file for complete search history.

(56) References Cited

U.S. PATENT DOCUMENTS

| | | | |
|---|---|---|---|
| 2,908,734 | A | 10/1959 | Cottle |
| 4,001,028 | A | 1/1977 | Frost et al. |
| 4,233,132 | A | 11/1980 | Carr et al. |
| 4,272,336 | A | 6/1981 | Vayenas et al. |
| 4,318,708 | A | 3/1982 | Hogberg |
| 4,329,208 | A | 5/1982 | Vayenas et al. |
| 4,463,065 | A | 7/1984 | Hegedus et al. |
| 4,512,964 | A | 4/1985 | Vayenas et al. |
| 4,643,806 | A | 2/1987 | Hegedus et al. |
| 4,673,473 | A | 6/1987 | Ang et al. |

(Continued)

FOREIGN PATENT DOCUMENTS

| | | |
|---|---|---|
| CN | 1280105 | 1/2001 |
| DE | 199 31 007 | 1/2001 |

(Continued)

OTHER PUBLICATIONS

Jose et al., "The Electrochemical Oxidation of Propane at Room Temperature", J. Appl. Chem. vol. 14, Feb. 1964, pp. 64-69.

(Continued)

*Primary Examiner* — Binh Q Tran
(74) *Attorney, Agent, or Firm* — Lipsitz & McAllister, LLC (57) ABSTRACT

The present invention provides methods and apparatus for controlling catalytic processes, including catalyst regeneration and soot elimination. An alternating current is applied to a catalyst layer and a polarization impedance of the catalyst layer is monitored. The polarization impedance may be controlled by varying the asymmetrical alternating current. At least one of water, oxygen, steam and heat may be provided to the catalyst layer to enhance an oxidation reaction for soot elimination and/or to regenerate the catalyst.

14 Claims, 5 Drawing Sheets

(56) References Cited

U.S. PATENT DOCUMENTS

| | | | |
|---|---|---|---|
| 5,006,425 | A | 4/1991 | Takabayashi |
| 5,232,882 | A | 8/1993 | Yoshimoto et al. |
| 6,194,623 | B1 | 2/2001 | Frenzel et al. |
| 6,214,195 | B1 | 4/2001 | Yadav et al. |
| 6,267,864 | B1 | 7/2001 | Yadav et al. |
| 6,387,228 | B1 | 5/2002 | Maget |
| 6,492,052 | B2 * | 12/2002 | Ren .............................. 429/480 |
| 6,562,495 | B2 | 5/2003 | Yadav et al. |
| 6,723,886 | B2 | 4/2004 | Allison et al. |
| 6,833,272 | B1 | 12/2004 | Binder et al. |
| 6,852,865 | B2 | 2/2005 | Coates et al. |
| 6,966,178 | B2 | 11/2005 | Saito et al. |
| 7,001,500 | B2 | 2/2006 | Bors et al. |
| 7,045,244 | B2 * | 5/2006 | Champion et al. ............ 429/458 |
| 7,087,147 | B2 | 8/2006 | Bors et al. |
| 7,541,308 | B2 * | 6/2009 | Menashi ....................... 502/185 |
| 7,838,164 | B2 * | 11/2010 | Adachi et al. ................. 429/483 |
| 7,964,084 | B2 * | 6/2011 | Stancovski et al. .......... 205/337 |
| 2001/0000889 | A1 | 5/2001 | Yadav et al. |
| 2002/0014417 | A1 | 2/2002 | Kuehnle et al. |
| 2002/0045076 | A1 | 4/2002 | Dieckmann et al. |
| 2002/0124551 | A1 | 9/2002 | Birkhofer et al. |
| 2002/0128506 | A1 | 9/2002 | Suib et al. |
| 2003/0010629 | A1 | 1/2003 | St-Pierre et al. |
| 2003/0118861 | A1 | 6/2003 | Heimann et al. |
| 2004/0166400 | A1 | 8/2004 | Gascoyne et al. |
| 2005/0027431 | A1 | 2/2005 | Todoroki et al. |
| 2005/0202660 | A1 | 9/2005 | Cohen et al. |
| 2005/0227381 | A1 | 10/2005 | Cao et al. |
| 2005/0244682 | A1 | 11/2005 | Meacham |
| 2006/0019130 | A1 | 1/2006 | Katikaneni et al. |
| 2006/0177367 | A1 | 8/2006 | Li et al. |
| 2006/0235091 | A1 | 10/2006 | Olah et al. |
| 2007/0161717 | A1 | 7/2007 | Hu et al. |
| 2007/0246364 | A1 | 10/2007 | Amlani et al. |
| 2007/0254969 | A1 | 11/2007 | Olah et al. |
| 2007/0255039 | A1 | 11/2007 | Coates et al. |

FOREIGN PATENT DOCUMENTS

| | | |
|---|---|---|
| EP | 0 480 116 | 4/1992 |
| EP | 0 665 047 | 8/1998 |
| EP | 0 903 476 | 3/1999 |
| JP | 04-99188 | 3/1992 |
| JP | 04-314881 | 11/1992 |
| JP | 05-117183 | 5/1993 |
| JP | 06-293681 | 10/1994 |
| JP | 08-103669 | 4/1996 |
| JP | 2002524258 | 8/2002 |
| JP | 2005-319413 | 11/2005 |
| JP | 2005327675 | 11/2005 |
| WO | 95/20556 | 8/1995 |

OTHER PUBLICATIONS

Seiyama et al., "Activities of Oxide Catalysts for the Allylic Oxidation of Olefins", Some Theor. Probl. Catal., Res. Rep. Sov.-Jap. Semin. Catal., 1st (no month, 1973), Meeting Date 1971, pp. 35-42, 1-Page. Abstract Only.

*Patent Abstracts of Japan*, Abstract of Japanese Patent "Carbon Dioxide Reduction Amount Calculation Device and Carbon Dioxide Reduction Amount Calculation Program", Publication No. 2009-258784, Nov. 5, 2009, Japanese Application No. 2008-103669, filed Apr. 11, 2008.

Hara, et al. "Electrocatalytic Fischer-Tropsch Reactions. Formation of Hydrocarbons and Oxygen-Containing Compounds from CO on a Pt Gas Diffusion Electrode," Bulletin of the Chemical Society of Japan vol. 70 (1997), No. 4 pp. 745-754 (abstract).

Larry L. Miller, et al., "Electrocatalytic Hydrogenation of Aromatic Compounds," The Journal of Organic Chemistry, 1978, vol. 43 No. 10, pp. 2059-2061.

Ch. Karavasilis et al., "Non-Faradaic Electrochemical Modification of Catalytic Activity—X. Ethylene Epoxidation on AG Deposited on Stabilized $ZrO_2$ in the Presence of Chlorine Moderators"—Journal of Catalysis 160, pp. 190-204, (1996).

Michael Stoukides et al., "The Effect of Electrochemical Oxygen Pumping on the Rate and Selectivity of Ethylene Oxidation on Polycrystalline Silver", Journal of Catalysis 70, pp. 137-146 (1981).

Jikang Yuan et al., "Spontaneous Formation of Inorganic Paper-Like Materials", Advanced Materials 2004, 16, No. 19 Oct. 4, pp. 1729-1732.

F. Richard Keene, "Thermodynamic, Kinetic, and Product Considerations in Carbon Dioxide Reactivity", Department of Chemistry and Biochemistry, James Cook University of North Queensland, Townsville, Australia, Chapter One—pp. 1-18 (undated).

A. Katsaounis, "Electrochemical Promotion of Catalysis (EPOC) Perspectives for Application to Gas Emissions Treatment", Global NEST Journal 2008, pp. 1-11.

Prachi Patel-Predd, "Carbon-Dioxide Plastic Gets Funding", MIT Technology Review (2007), one page.

Device Uses Solar Energy to Convert Carbon Dioxide into Fuel (Update), Physorg.com, pp. 1-2 (undated).

Toshiyasu Sakakura, et al., "Transformation of Carbon Dioxide" Chem. Rev. 2007, vol. 107, pp. 2365-2387.

Aimin Huang, et al., "$CO_2$ Reforming of $CH_4$ by Atmospheric Pressure ac Discharge Plasmas" Journal of Catalysis, 189, pp. 349-359 (2000).

Steven L. Suib, et al., "A Direct, Continuous, Low-Power Catalytic Conversion of Methane to Higher Hydrocarbons via Microwave Plasmas" Journal of Catalysis, 139, pp. 383-391 (1993).

K. Ogura, et al., "Reduction of $CO_2$ to Ethylene at Three-Phase Interface Effects of Electrode Substrate and Catalytic Coating", Journal of the Electrochemical Society, 152 (12), pp. D213-D219 (2005).

Michael Schwartz, et al., "Fischer-Tropsch Electrochemical $CO_2$ Reduction to Fuels and Chemicals", Journal of the Electrochemical Society, vol. 141 No. 11, Nov. 1994, pp. 3119-3127.

Shigeki Furukawa, et al., "Isolation of Oxygen Formed during Catalytic Reduction of Carbon Dioxide Using a Solid Electrolyte Membrane" Energy & Fuels, 1999, 13, pp. 1074-1081.

M. Gattrell, et al., "A Review of the Aqueous Electrochemical Reduction of $CO_2$ to Hydrocarbons at Copper," Journal of Electroanalytical Chemistry, 594, (2006) pp. 1-19.

G. R. Dey, et al., "Gas-Phase and On-Surface Chemical Reduction of $CO_2$ to HCHO and CO Under Dielectric Barrier Discharge," Plasma Chem Plasma Process (2006), 26, pp. 495-505.

"Research Proposal for the Enhancement of Fischer-Topsch Process," Proof of concept performed at the University of Connecticut (2005-2006) pp. 3-15.

Ali et al., "Selective Formation of $HCO_2^-$ and $C_2O_4^{2-}$ in Electrochemical Reduction of $CO_2$ Catalyzed by Mono- and Di-Nuclear Ruthenium Complexes," Chem. Commun., 1998, pp. 249-250.

J. Llorca, et al., "On the Reaction between Carbon Dioxide, Ethylene, and Water over Supported Platinum-Tin Catalysts. A Combined Drift-Mass Spectrometry Study." Journal of Catalysis, 197, pp. 220-223 (2001).

Yoshie Kitayama, et al., "Catalytic Reduction of Carbon Dioxide on Ni-Cu Alloys." Energy, vol. 22 No. 2/3, pp. 177-182 (1997.

Koji Tanaka, et al., "Multi-electron reduction of $CO_2$ via $Ru-CO_2$, -C(O)OH, -CO, -CHO, and $-CHO_2OH$ Species," Coordination Chemistry Reviews, 226, (2002)pp. 211-218.

Xiaolong Yin, et al., "Recent Developments in the Activation of Carbon Dioxide by Metal Complexes." Coordination Chemistry reviews, vol. 181, (1999) pp. 27-59.

Xiao-Guang Zhang, et al., "Activation of $O_2$ and $CO_2$ by $PtO^+$: The Thermochemistry of $PtO_2^+$" J. Phys. Chem. A, 2003, 107, pp. 8915-8922.

C.G.Vayenas, et al., "Dependence of Catalytic Rates on Catalyst Work Function," Letters to Nature, vol. 343, pp. 625-627 (Feb. 15, 1990).

Bruce A. Parkinson, et al., "Photoelectrochemical Pumping of Enzymatic $CO_2$ Reduction," Letters to Nature, vol. 309, pp. 148-149 (May 10, 1984).

Daniel Mandler, et al., "Effective Photoreduction of $CO_2/HCO_3^{2-}$ to Formate Using Visible Light," J. Am. Chem. Soc., 1987, 109, pp. 7884-7885.

Steven L. Suib, et al., "Efficient Catalytic Plasma Activation of $CO_2$, NO, and $H_2O$," J. Phys. Chem. B., 1998, 102, pp. 9661-9666.

J. Zhang, et al., "Stabilization of Platinum Oxygen-Reduction Electrocatalysts Using Gold Clusters," Science Magazine, vol. 315, pp. 220-222, Jan. 12, 2007.

Matthew W. Kanan, et al., "In Situ Formation of an Oxygen-Evolving Catalyst in Neutral Water Containing Phosphate and $Co^{2+}$," Science Magazine, vol. 321, pp. 1072-1075, Aug. 22, 2008.

C. Pliangos, et al, "Electrochemical Promotion of the $NO_x$ Reduction over Pt, Pd and Rh Catalysts", University of Patras, Department of Chemical Engineering, Greece, 2 pages (undated).

S.G. Neophytides, et al, "Non-Faradaic Electrochemical Modification of the Catalytic Activity of Pt for $H_2$ Oxidation in Aqueous Alkaline Media", J. Phys. Chem., 1996, vol. 100 No. 35, p. 14803 (Abstract).

"New Electrochemically Smart Catalysts for Hazardous Waste Management and Development of Capillary Electrophoresis for Analysis of their Products" Lamar University, 2 Pages (undated).

K. Ogura, et al, "Reduction of $CO_2$ to Ethylene at Three-Phase Interface Effects of Electrode Substrate and Catalytic Coating", Journal of Electrochemical Society, 152 (12), pp. D213-D219 (2005).

Nobuhito Imanaka, et al, "Total Nitrogen Oxides Gas Sensor Based on Solid Electrolytes with Refractory Oxide-Based Auxiliary Electrode", Journal of Electrochemical Society, 151 (5), pp. H113-H116 (2004).

V. Stamenkovic, et al, "Surface Segregation Effects in Electrocatalysis: Kinetics of Oxygen Reduction Reaction on Polycrystalline $Pt_3Ni$ Alloy Surfaces", Journal of Electroanalytical Chemistry, 554-555 (2003), pp. 191-199.

V. Stamenkovic, et al, "Surface Composition Effects in Electrocatalysis: Kinetics of Oxygen Reduction on Well-Defined $Pt_3Ni$ and $Pt_3Co$ Alloy Surfaces", J. Phys. Chem. B, 2002, vol. 106, pp. 11970-11979.

Atanu Dutta, et al, "Study of YSZ-Based Electrochemical Sensors with $WO_3$ Electrodes in $NO_2$ and CO Environments", Journal of Electrochemical Society, 150 (2), pp. H33-H37, 2003.

P.E. Tsiakaras, et al, "The Oxidation of Ethanol Over Pt Catalyst-Electrodes Deposited on $ZrO_3$ (8 mol% $Y_2 O_3$)", Solid State Ionics, 152-153, (2002) pp. 721-726, 2002.

ChunJie Fan, et al, "Studies of Surface Processes of Electrocatalytic Reduction of $CO_2$ on Pt(210), Pt(310) and Pt(510)", Science in China Series B: Chemistry, vol. 50 No. 5, Oct. 2007, pp. 593-598.

Nagahiro Hoshi, et al, "Electrochemical Reduction of Carbon Dioxide on Kinked Stepped Surfaces of Platinum Inside the Stereographic Triangle", Journal of Electroanalytical Chemistry, 540 (2003), pp. 105-110.

Na Tian, et al, "Synthesis of Tetrahexahedral Platinum Nanocrystals with High-Index Facets and High Electro-Oxidation Activity", Science, vol. 316 May 4, 2007, pp. 732-735.

Christos Kokkofitis, et al, "Catalytic Study and Electrochemical Promotion of Propane Oxidation on Pt/YSZ", Journal of Catalysis, 234 (2005), pp. 476-487.

P. Vernoux, et al, "Electrochemical Promotion of Propane and Propene Oxidation on Pt/YSZ", Journal of Catalysis, vol. 208, (2002) pp. 412-421.

Aman Arora, "Ceramics in Nanotech Revolution", Advanced Engineering Materials, vol. 6 No. 4 (2004), pp. 244-247.

"Interdisciplinary Research Center for Catalysis", Technical University of Denmark, Annual Report 2001, pp. 1-34.

Worapon Kiatkittipong, et al, "TPD Study in LSM/YSZ/LaAIO System for the Use of Fuel Cell Type Reaction", Solid State Ionics, 166 (2004), pp. 127-136.

Thème IES "Promotion Électrochimique de Réactions Catalytiques (effet NEMCA)" (undated).

"Advanced Propulsion Systems and Emission Reduction Technologies—PREMTECH", Thematic Network, Final Report, pp. 1-34 (2001).

D. Tsiplakides, et al, "Work Function and Catalytic Activity Measurements of an $IrO_2$ Film Deposited on YSZ Subjected to in Situ Electrochemical Promotion", J. Electrochem. Soc., vol. 145 No. 3, Mar. 1998, pp. 905-908.

E.A. Baranova, et al, "Electrochemical Promotion of Ethylene Oxidation over Rh Catalyst Thin Films Sputtered on YSZ and $TiO_2$ /YSZ Supports", Journal of Electrochemical Society, 152 (2), pp. E40-E49, 2005.

Ilan Riess, et al, "Fermi Level and Potential Distribution in Solid Electrolyte Cells With and Without Ion Spillover", Solid State Ionics, 159 (2003), pp. 313-329.

P. Vernoux, et al, "Coupling Catalysis to Electrochemistry: A Solution to Selective Reduction of Nitrogen Oxides in Lean-Burn Engine Exhausts?" Journal of Catalysis, 217 (2003), pp. 203-208.

Bijan Miremadi, et al, "Low-Temperature Hydrogen Production Using Electrically Activated Catalysts", Chem. Commun., 2000, pp. 1875-1876.

Ezequiel P.M. Leiva, et al, "NEMCA Effect: Why Are the Work Function Changes of the Gas Exposed Catalyst-Electrode Surface One-to-One Related to the Changes in the Catalyst Working Electrode Potential?", Journal of Solid State Electrochemistry (2003), pp. 1-13.

S.G. Neophytides, et al, "Selective Interactive Grafting of Composite Bifunctional Electrocatalysts for Simultaneous Anodic Hydrogen and CO Oxidation", Journal of Electrochemical Society, 150 (10), (2003) pp. E512-E526.

C. N. Costa, et al., "Mathematical Modeling of the Oxygen Storage Capacity Phenomenon Studied by CO Pulse Transient Experiments Over $Pd/CeO_2$ Catalyst," Journal of Catalysis 219 (2003) pp. 259-272.

Alfred B. Anderson, et al. "Mechanism for the Electro-oxidation of Carbon Monoxide on Platinum, Including Electrode Potential Dependence," Journal of the Electrochemical Society, 149 (10) (2002) pp. E383-E388.

Jingxin Zhang, et al., "Mechanistic and Bifurcation Analysis of Anode Potential Oscillations in PEMFCs with CO in Anode Feed," Journal of the Electrochemical Society, 151 (5) (2004) pp. A689-A697.

C. Pliangos, et al. "Electrochemical Promotion of the Reduction of NO in Presence of Oxygen." University of Patras, Department of Chemical Engineering, Greece, one page (undated).

Raymond J. Gorte, et al. "Novel SOFC Anodes for the Direct Electrochemical Oxidation of Hydrocarbons," University of Pennsylvania, Department of Chemical and Biomolecular Engineering, 20 pages, (2003).

"Optimisation of Solid State Electrochemical Processes for Hydrocarbon Oxidation (OSSEP)," European Science Foundation, Oct. 2000, 8 pages.

S.L. Douvartzides, et al., "Electrochemically Promoted Catalysis: The Case of Ethanol Oxidation over Pt," Journal of Catalysis 211, pp. 521-529, 2002.

D. Tsiplakides et al., "Introduction to Electrochemical Promotion, *Non-faradaic Electrochemical Modification of Catalytic Activity (NEMCA effect)*," J. Electrochemical Soc., 144(6), 272-288, 1997 (25 pages).

*Modern Aspects of Electrochemistry* No. 29, "The Electrochemical Activation of Catalytic Reactions", Constantinos G. Vayenas et al., pp. 57-202, Plenum Press—New York and London, 1996.

T.J. Schmidt et al., "Oxygen electrocatalysis in alkaline electrolyte: Pt(*hkl*), Au(*hkl*) and the effect of PD-modification," Electrochimica Acta 47, pp. 3765-3776, 2002.

Gianfranco Pacchioni et al., "Electric field effects in heterogeneous catalysis," Journal of Molecular Catalysis A: Chemical 119, pp. 263-273, 1997.

Ian S. Metcalfe, "Electrochemical Promotion of Catalysis, II: The Role of a Stable Spillover Species and Prediction of Reaction Rate Modification," Journal of Catalysis 199, pp. 259-272, 2001.

G. Fóti et al., "Transient Behavior of Electrochemical Promotion of Gas-Phase Catalytic Reactions," Journal of Electroanalytical Chemistry 532, pp. 191-199, 2002.

S. Bebelis et al., "Electrochemical Activation of Catalytic Reactions Using Anionic, Cationic and Mixed Conductors," Solid State Ionics 129, pp. 33-46, 2000.

Soonho Kim et al., "Solid Electrolyte Aided Studies of NO-CO Reaction on Pd," Solid State Ionics 136-137, pp. 693-697, 2000.

G. Fóti et al., "Electrochemical Promotion of $IrO_2$ Catalyst for the Gas-Phase Combustion of Ethylene," publisher and publication date unknown (1 page).

Seetharaman Sridhar, et al. "Effect of Oxygen-Containing Species on the Impedance of the Pt/YSZ Interface" Solid State Ionics 100 (1997) 17-22.

Seetharaman Sridhar, et al. "Transient and Permanent Effects of Direct Current on Oxygen Transfer across YSZ-Electrode Interfaces" Journal of the Electrochemical Society, vol. 144; No. 7, Jul. 1997, 2479-2485.

Victor Stancovski et al., "Thermodynamic Stability and Interfacial Impedance of Solid-Electrolyte Cells with Noble-Metal Electrodes" Journal of Electroceramics 3:3, pp. 279-299; 1999.

Impedance Spectroscopy-Emphasizing Solid Materials and Systems, Chapter 4—Applications of Impedance Spectroscopy, Section 4.3—Corrosion of Material, pp. 260-267, John Wiley & Sons, Inc. 1987, J. Ross Macdonald, Editor (10 pages).

B.S. Bal'zhinimaev, et al. "Phase Transition in a Bed of Vanadium Catalyst for Sulfuric Acid Production: Experiment and Modeling," Chemical Engineering Journal 84 (2001) pp. 31-41.

Hamilton, Methods of Conserving Archaeological Material from Underwater Sites, Jan. 1, 1999, Ref. 1, Anthropology 605, Consecration of Archaeological Resources I, pp. 79-83.

Jothiramalingam et al., "Synthesis, Characterization and Catalytic Oxidation Activity of Zirconium Doped K-OMS-2 Type Manganese Oxide Materials", Journal of Molecular Catalysis A: Chemical (no month, 2006) vol. 252, pp. 49-55.

Otsuka et al., "Electrocatalytic Synthesis of Propylene Oxide During Water Electrolysis", Journal of Catalysis (no month, 1995) vol. 157, pp. 450-460.

Craciun et al., "Structure and Redox Properties of MnOx/Yttrium-Stabilized Zirconia (YSZ) Catalyst and Its Used in CO and CH4 Oxidation", Applied Catalysis A: General (no month, 2003), vol. 243, pp. 67-79.

Hofstad et al., Partial Oxidation of Methane Over Platinum metal Gauze:, Catalysis Letters (no month, 1996), vol. 36, pp. 25-30.

Peyman Mirtaheri et al., "Electrode Polarization Impedance in Weak NaCl Aqueous Solutions", IEEE Transactions on Biomedical Engineering, vol. 52, No. 12, Dec. 2005, pp. 2093-2099.

Joseph DeRosa et al., "Linear AC Electrode Polarization Impedance at Smooth Noble Metal Interfaces", IEEE Transactions on Biomedical Engineering, vol. BME-24, No. 3, May 1977, pp. 260-268.

H.P. Schwan, "Alternating Current Electrode Polarization", Radiation and Environmental Biophysics, vol. 3, No. 2, 1966, pp. 181-201.

* cited by examiner a) from gaseous oxygen b) oxygen supplied through the electrolyte

(PRIOR ART)

The presence of OCS at the TPB.

(PRIOR ART)

METHODS AND APPARATUS FOR CONTROLLING CATALYTIC PROCESSES, INCLUDING CATALYST REGENERATION AND SOOT ELIMINATION

This application is a divisional of U.S. patent application Ser. No. 11/588,113 filed on Oct. 25, 2006, which is a continuation-in-part of commonly owned U.S. patent application Ser. No. 10/423,376 filed on Apr. 25, 2003 (now U.S. Pat. No. 7,325,392), and which also claims the benefit of U.S. provisional patent application Ser. No. 60/731,570 filed on Oct. 28, 2005, each of which is incorporated herein and made a part hereof by reference for all purposes as if set forth in their entirety.

BACKGROUND OF THE INVENTION

The present invention relates generally to catalytic processes. More particularly, the present invention provides methods and apparatus for controlling catalytic processes, including catalyst regeneration and soot elimination.

Catalyst systems are employed extensively to reform light hydrocarbon streams, i.e. reduce methane and other light hydrocarbons to hydrogen, and to remediate exhaust streams, including reducing and/or oxidizing internal combustion engine exhaust to innocuous compounds.

A problem encountered with prior art catalyst systems is poisoning of the catalyst. One source of such poisoning is the adsorption/infiltration of oxygen-containing species such as carbon monoxide. Carbon monoxide interferes with the catalysis mechanism. Another source of poisoning is the deposition of carbon.

Methods of addressing catalyst poisoning include applying to the catalyst a direct current (DC) electric field and/or heating it to an elevated temperature, i.e. about 300° C. to about 800° C. Most commonly, an electric field and heat are concurrently applied. Application of a DC electric field and heat expels or pumps oxygen-containing molecular species from the catalyst. Examples of the prior art application of DC current and/or heat to a catalyst are described in the following: U.S. application Nos. 2001/0000889; 2002/0045076; U.S. Pat. Nos. 4,318,708; 5,006,425; 5,232,882; 6,214,195; and 6,267,864.

For example, it is known that the yield of the catalytic processes can be increased (enhanced) by the polarization of the catalytic interfaces under certain conditions. The overall voltages applied are low (up to 1-2 V), but they are applied across interfaces which are very thin (e.g., the thickness of the interface is on the order of magnitude of ~1 nanometer, which is close to the diameter of a small molecule). This leads to the creation of very high electric fields across the polarized interfaces: the order of magnitude of these fields can be as high as $10^6$ V/cm or more. Such high fields polarize (excite) the molecules of the substances that react in the catalytic system, and can pump ions across the interface. The result of these processes is that under controlled conditions, the concentration and the activity of catalytic sites available for the reaction increases beyond the concentration that was determined by the preparation process of the catalyst. This process is known in the prior art as the NEMCA (Nonfaradaic Electrochemical Modification of Catalytic Activity) effect. However, the enhancement of the catalytic activity achieved by the NEMCA effect is very difficult to control.

One problem encountered with application of a DC electric field to catalyst systems is a lack of a means for monitoring and sensing the level of poisoning present in the catalyst in real time or on a continuous basis. This lack of means to monitor and sense the level of poisoning in the catalyst in real time hinders precise and timely application of the DC electric fields. Precise and timely application of DC electric field is important because if the field is too weak, the rate of expulsion of oxygen-containing species may be too low and such species may accumulate. If the DC field is too strong, the incidence of catalytically effective sites in the catalyst may be reduced.

The application of heat to catalyst systems also has the problem of a lack of real time control means, and also suffers from imprecise effects of temperature on catalyst behavior and the physical structure of the catalyst system. If the temperature of the catalyst is too low, the catalyst may become fouled (dirty) and the kinetics of the catalyzed reaction may be negatively altered. If the temperature is too high, the kinetics of the catalyzed reaction may be negatively altered and/or the microstructure of the catalyst may be destroyed.

It would be advantageous to provide systems and processes for reducing catalyst poisoning while providing improved reduction in exhaust emissions.

It would also be advantageous to provide an active catalytic process, as opposed to the passive nature of prior art catalytic processes.

It would be further advantageous to provide a simple, real time way to control the enhancement of catalytic reactions.

It would be still further advantageous not only to enhance the oxidation reactions in the catalyst, but also to oxidize carbon particles (soot) to CO and subsequently to $CO_2$, resulting in a drastic decrease (and possibly complete elimination) of soot particles from the diesel exhaust gases and also to regenerate the catalyst.

The methods, apparatus, and systems of the present invention provide the foregoing and other advantages.

SUMMARY OF THE INVENTION

The present invention provides methods and apparatus for controlling catalytic processes, including catalyst regeneration and soot elimination.

One example embodiment of the present invention provides a method for controlling a catalytic process. The method comprises providing an asymmetrical alternating current to a catalyst layer, monitoring a polarization impedance of the catalyst layer, and controlling the polarization impedance by varying the asymmetrical alternating current.

The method may further comprise providing oxygen to the catalyst layer to generate an oxidation reaction for eliminating carbon particles from the catalyst layer. Alternatively or additionally thereto, one of water and steam may be provided to the catalyst layer to enhance the oxidation reaction.

The catalyst layer may be applied to a catalytic reactor. The catalytic reactor may comprise a filter which retains the carbon particles. The deposition of the carbon particles on the catalyst layer may be monitored. The monitoring of the deposition of the carbon particles may comprise monitoring at least one parameter which describes an interfacial impedance of the catalyst layer and determining an amount of the carbon particles deposited on the catalyst layer as a function of values of the at least one monitored parameter. For example, the at least one monitored parameter may comprise at least one of the monitored polarization impedance and a phase angle of the interfacial impedance.

In a further example embodiment of the present invention, at least one of an amplitude and a phase of the asymmetrical alternating current may be varied in order to regenerate the catalyst layer. For example, the at least one of the amplitude and the phase of the asymmetrical alternating current may be varied to bring the polarization impedance to a value within a predetermined range of values when the polarization impedance value falls outside of this predetermined range. This predetermined range may be a range of values around an original polarization impedance value of the catalyst layer prior to use (e.g., a clean catalyst layer).

Further, the at least one of the amplitude and the phase of the asymmetrical alternating current may be varied to achieve a phase angle of an interfacial impedance of the catalyst layer which is within a range of between approximately −5 degrees and +5 degrees.

In another example embodiment of the present invention, the application of at least one of water, oxygen, and heat to the catalyst layer may be controlled to enhance the regeneration of the catalyst layer.

Further, a partial pressure of oxygen in a carrier gas applied to the catalyst layer may be controlled (varied) in order to enhance the regeneration of the catalyst layer.

An alternate example embodiment of the present provides a further method for controlling a catalytic process. In such an example embodiment, the method comprises monitoring a polarization impedance of the catalyst layer and controlling at least one of an amount of water and an amount of oxygen applied to the catalyst layer.

In such an example embodiment, an alternating current may be applied to the catalyst layer and the polarization impedance may be controlled by varying the alternating current.

The method may further comprise varying at least one of a phase and an amplitude of the alternating current and/or controlling the at least one of the amount of the water and the amount of the oxygen applied to the catalyst layer to provide at least one of oxidation of carbon particles on the catalyst layer and regeneration of the catalyst layer.

In addition, an amount of heat applied to the catalyst layer may be controlled in order to further control or assist in the regeneration of the catalyst.

The amount of the oxygen may be controlled by varying a partial pressure of oxygen in a carrier gas applied to the catalyst layer.

The method may further comprise monitoring deposition of the carbon particles on the catalyst layer. The monitoring of the deposition of the carbon particles may comprise monitoring at least one parameter which describes an interfacial impedance of the catalyst layer, and determining an amount of the carbon particles deposited on the catalyst layer as a function of values of the at least one monitored parameter. The at least one monitored parameter may comprise at least one of the monitored polarization impedance and a phase angle of the interfacial impedance.

In a further example embodiment of the present invention, the water may be heated to generate steam. In such an example embodiment, the controlling of the amount of the water applied to the catalyst layer may comprise controlling an amount of steam applied to the catalyst layer.

When regenerating the catalyst, the at least one of the amplitude and the phase of the alternating current may be varied to return the polarization impedance to a value within a predetermined range of values when the polarization impedance value falls outside of this predetermined range. The predetermined range may be a range of values around an original polarization impedance value of the catalyst layer prior to use.

In addition, when regenerating the catalyst, the at least one of the amplitude and the phase of the asymmetrical alternating current may be varied to achieve a phase angle of an interfacial impedance of the catalyst layer which is within a range of between approximately −5 degrees and +5 degrees.

In one example embodiment, the alternating current may comprise an asymmetrical alternating current.

The catalyst layer may be applied to a catalytic reactor. The catalytic reactor may comprise a filter which retains the carbon particles.

The controlling of the at least one of the amount of water and the amount of oxygen applied to the catalyst layer may comprise controlling an amount of steam applied to the catalyst layer.

The controlling of the amount of the oxygen applied to the catalyst layer may comprise controlling environmental oxygen levels present in the exhaust stream.

The present invention provides apparatus and systems corresponding to the above described methods.

BRIEF DESCRIPTION OF THE DRAWINGS

The present invention will hereinafter be described in conjunction with the appended drawing figures, wherein like reference numerals denote like elements, and:

FIG. 1 (FIGS. 1a and 1b) shows the known formation of partially blocking oxygen containing species at the three phase boundary;

FIG. 2 (FIGS. 2a and 2b) shows the known action of the partially blocking species at the three phase boundary;

FIG. 5 (FIGS. 5a and 5b) shows block diagrams of example embodiments of the present invention as applied to fuel cells.

DETAILED DESCRIPTION

The ensuing detailed description provides exemplary embodiments only, and is not intended to limit the scope, applicability, or configuration of the invention. Rather, the ensuing detailed description of the exemplary embodiments will provide those skilled in the art with an enabling description for implementing an embodiment of the invention. It should be understood that various changes may be made in the function and arrangement of elements without departing from the spirit and scope of the invention as set forth in the appended claims.

Example embodiments of the present invention have been found to enhance the catalytic activity of prior art systems by a factor of 2 (and possibly more) as a consequence of the action of a process called the DECAN process (Dynamic Enhancement of the Catalytic Activity at Nanoscale), developed by Catelectric Corp., the assignee of the present invention.

Whereas the prior art NEMCA effect is essentially a DC phenomenon, the DECAN technology developed by Catelectric is built upon processes that occur under an alternating or variable current/voltage scheme.

The DECAN process provides a simple, real time way to control the enhancement of catalytic reactions. The DECAN process is described in detail in Applicant's co-pending U.S. patent application Ser. No. 10/423,376 filed on Apr. 25, 2003.

The real time control of the enhancement process in accordance with the example embodiments of the present invention is essential for the efficient operation of an enhanced catalytic system. With Applicants' DECAN process, measurements sensed from the catalysts are fed into a simple electronic control module, which adjusts, also in real time, the polarization state of the interface through the application of alternating or variable voltages and currents.

Seetharaman et al., in an article entitled "Transient and Permanent Effects of Direct Current on Oxygen Transfer Across YSZ-Electrode Interfaces" [Journal of the Electrochemical Society, Vol. 144, no. 7, July 1997] ("Seetharaman"), identified and described a hysteresis effect at the three-phase boundaries in Pt/YSZ/gas environments, when the interface transitions from a cathodic to an anodic current (see, e.g., FIG. 8 of Seetharaman). The concentration of the oxygen-containing sites present at equilibrium can be modified by the passage of a cathodic or an anodic current, respectively. These changes have a dynamic effect on the properties of the interface, as, for instance, on its catalytic properties. The present invention achieves control of this hysteresis effect through the real-time monitoring of certain electrical properties of the catalytic interface. These electrical properties are determined as an average value over the whole interface involved in the catalytic process, and are therefore reflecting in real time the average catalytic activity.

Figure 1A:
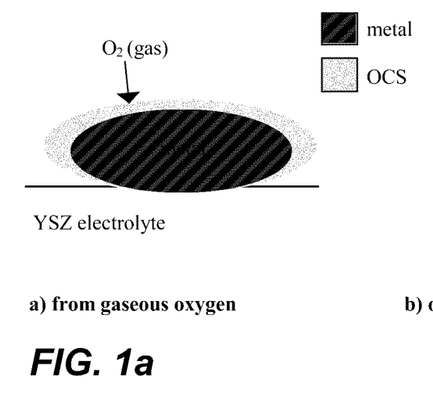
Figure 1B:
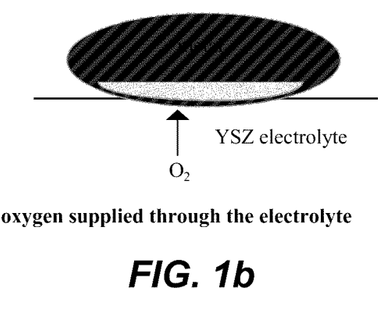
Figure 2A:
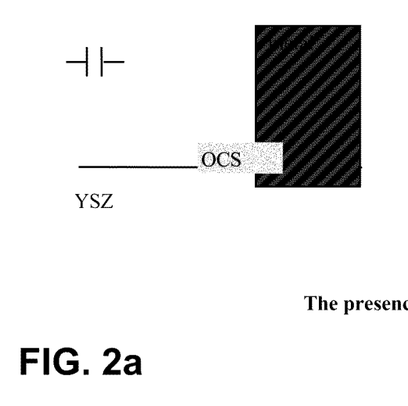
Figure 2B:
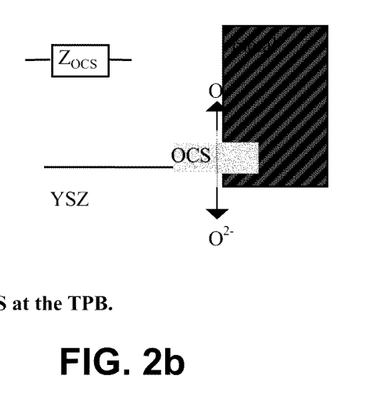

Seetharaman et al. assigned this hysteresis effect to the coexistence of different species, including species pumped electrochemically to or away from the interface. Subsequent work [see, e.g., Seetharaman et al., "Thermodynamic Stability and Interfacial Impedance of Solid-Electrolyte Cells with Noble-Metal Electrodes [Journal of Electroceramics, 3:3, 279-299, 1999], has shown that this hysteresis is related to the transient formation of partially blocking species at the charge transfer interface (the three phase boundary (TPB)) as illustrated in FIGS. 1 and 2.

These species (e.g., oxygen-containing species (OCS)), are active in the charge transfer and in the electrocatalytic reactions occurring at the TPB. When OCS is present at the TPB, it may block the reaction if it is insulating with respect to ions as well as electrons (see FIG. 2a). Electrically, the interface may be represented by a capacitor. On the other hand, the OCS may only be partially blocking. The OCS may then act as an intermediate step in the charge-transfer process (see FIG. 2b). Such a result is likely if the OCS consists of oxygen loosely bonded to the metal surface. In this case, the interfacial process is associated electrically with an impedance $Z_{OCS}$ (referred to herein as "interfacial impedance").

The magnitude of the interfacial impedance, $Z_{OCS}$ depends on the strength of the Metal-O bonds that need to be broken or established in the oxygen-transfer process.

Therefore, the value of the interfacial impedance is directly related to the concentration of the OCS, which, in turn, is related to the concentration of the electrocatalytic sites at the interface. Accordingly, the values of the interfacial impedance for a given system are therefore reliable indicators of the concentration of catalytic sites, which determines the rate of the reaction occurring at the interface.

The correlation between the interfacial impedance and the yield of the catalytic reaction is a complex function, which may be determined experimentally. In accordance with various embodiments of the present invention, the yield of the system can be maximized by a continuous control of the NEMCA parameters by the alternating current applied to the system (the pattern of change of the voltage and current density in the time domain) and by monitoring the complex (AC) impedance of the interface. This is the principle of the DECAN process of the present invention.

Various example embodiments of the present invention provide the capability to force, enhance, and/or boost the reduction of NO (effectively controlling the pumping of the oxygen out of the $NO_x$ molecular species) beyond the capability of the current state-of-the-art catalytic systems.

Certain embodiments of the present invention also provide the capability to force, enhance, and/or boost the oxidation of CO to $CO_2$. As a corollary to the enhancement of the oxidation reactions, example embodiments of present invention provide the ability to oxidize carbon particles (soot) to CO and subsequently to $CO_2$, resulting in a drastic decrease (and possibly complete elimination) of soot particles from the Diesel exhaust gases. However, it has not yet been determined what will happen with the other, minor components of the exhaust gases (inorganic ash), which is not the focus of the present invention. However, those skilled in the art will appreciate that the addition of an electrostatic filter downstream from the catalytic converter may provide one solution for dealing with these components. Such filters may be similar in design to those used in cement production.

Additionally, example embodiments of the present invention also enable regeneration of the catalyst in-situ, with a slight hysteresis.

Further, example embodiments of the present invention provide a built-in sensing capacity for sensing the changes in the gas composition based on the quantification of the trends in the subsets of a matrix of data providing the correlation between initial (pre-DECAN) gas composition at a given temperature, and the parameters of the DECAN process (real and imaginary components of the impedance, pattern of the application of variable voltage, pattern of the application of variable current, the pattern of the cross-correlation of the voltage and current (expressed by the matrix characterizing the vectorial product of the current and voltage, which are complex quantities in the time domain). A Fast Fourier Transform FFT algorithm may be used to generate a synthetic characteristic based on the response of the gas composition to the applied voltage/current, i.e., as a fingerprint of a change in composition.

Polarization impedance is the difference between impedance measured at low and high frequencies of alternating current. Polarization impedance can be calculated according to the following formulas I and II:

$$i_{corr} = [\beta_a \beta_c / 2.303(\beta_a + \beta_c)][1/R_p] \quad (I)$$

$$R_p = |Z(jw)|_{w \to 0} - |Z(jw)|_{w \to \infty} \quad (II)$$

wherein $i_{corr}$ equals a steady state corrosion current;
$\beta_a$ is the Tafel constant for an anodic reaction;
$\beta_c$ is the Tafel constant for a cathodic reaction;
$R_p$ is the polarization impedance (ohm);
$w = 2 \times \pi \times f$ wherein f is the frequency of the alternative current applied and expressed in hertz (Hz);
j is the imaginary unit number $(-1)^{1/2}$;
Z(jw) is the complex impedance of the interface as a function of the frequency (ohm);
$(jw)|_{w \to 0}$ is the complex impedance of the interface when the frequency approaches zero (ohm); and
$(jw)|_{w \to \infty}$ is the complex impedance of the interface when the frequency approaches a very high frequency(ohm).

Test frequencies will vary depending on the characteristics and requirements of the system, but suitable low frequencies typically range from about 0.1 Hz to about 100 Hz and suitable high frequencies typically range from about 10 kilohertz to about 5 megahertz. Polarization impedance is typically expressed in ohm The method for calculating polarization impedance is set forth in *Applications of Impedance Spectroscopy*, J. Ross McDonald, p. 262, John Wiley & Sons (1987), which is incorporated herein by reference.

In the present control system, the polarization impedance generally corresponds to the difference or drop in AC current across a catalyst layer/electroconductive support, which will vary in structure depending upon the structure of the catalyst system. The difference in AC current will usually be between the first electrode/second electrode and the AC sensor. The polarization impedance is obtained when the impedance is measure at a low and a high frequency.

Figure 3:
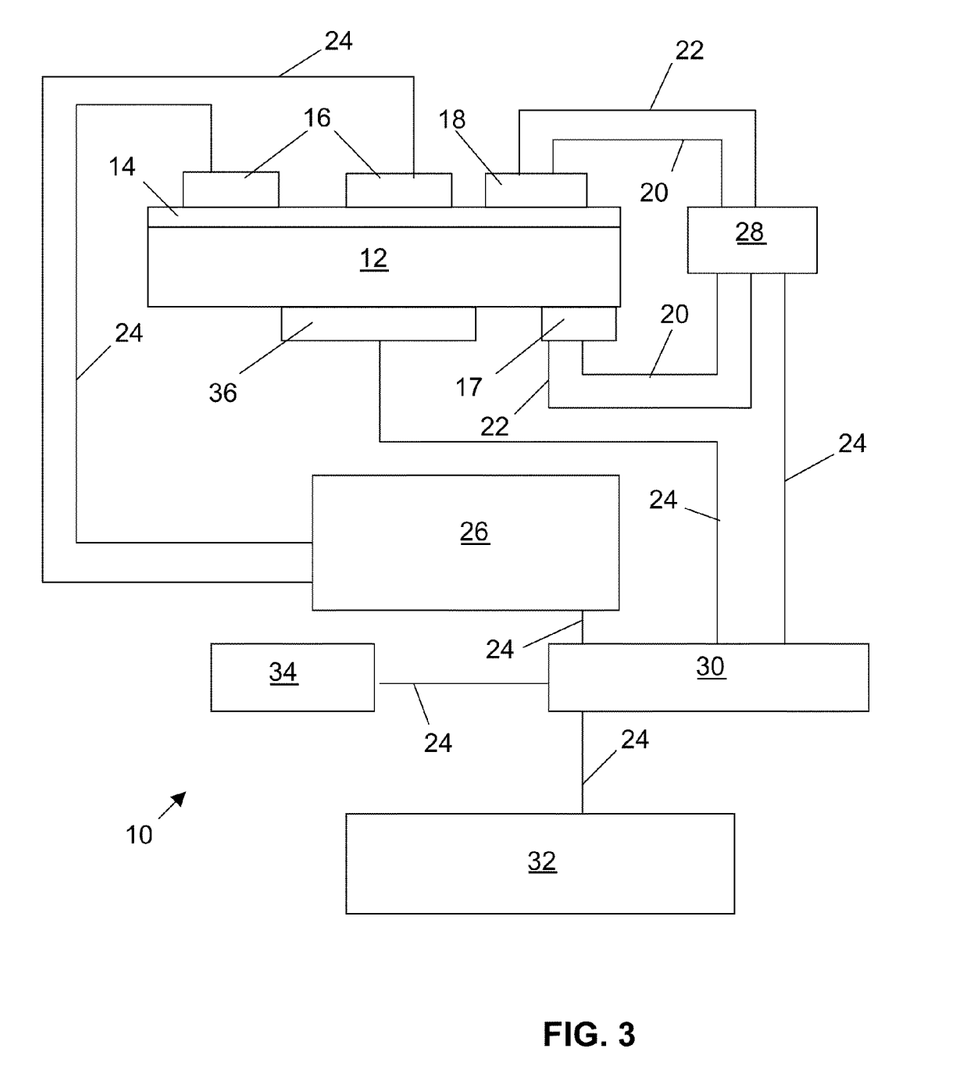
FIG. 3 shows a block diagram of an example embodiment of the present invention.

An example embodiment of a control system for controlling the DECAN process in accordance with the present invention is shown in FIG. 3 and is generally referenced by the numeral 10. Control system 10 has an electroconductive support 12 and a catalyst layer 14 situated thereon. A current control unit 28 communicates with and controls and provides DC current to a first electrode 17 and a second electrode 18 through current cables 20. First electrode 17 is contiguous to and in electrical contact with electroconductive support 12. Second electrode 18 is contiguous to and in electrical contact with catalyst layer 14. Current control unit 28 also controls and provides AC current to first electrode 17 and second electrode 18 through current cables 22. A polarization impedance measurement unit 26 communicates with AC sensors 16, which are contiguous to and electrical contact with catalyst layer 14 through data transmission cables 24. Control system 10 also has a heater 36 and a heating control unit 34. Heating control unit 34 communicates with heater 36 through an interface 30 and a data transmission cable 24. The current control unit 28, polarization impedance measurement unit 26, and heating control unit 34 communicates with and are controlled by a central processing unit 32 through interface 30. When control system 10 is in operation, the process throughput such as a hydrocarbon stream or combustion exhaust will contact catalyst layer 14 as it impinges or otherwise traverses it. Electrodes may take any electroconductive form, but usually take the form of an electrically conductive wire or conduit contacting catalyst layer 14 or support 12.

Figure 4:
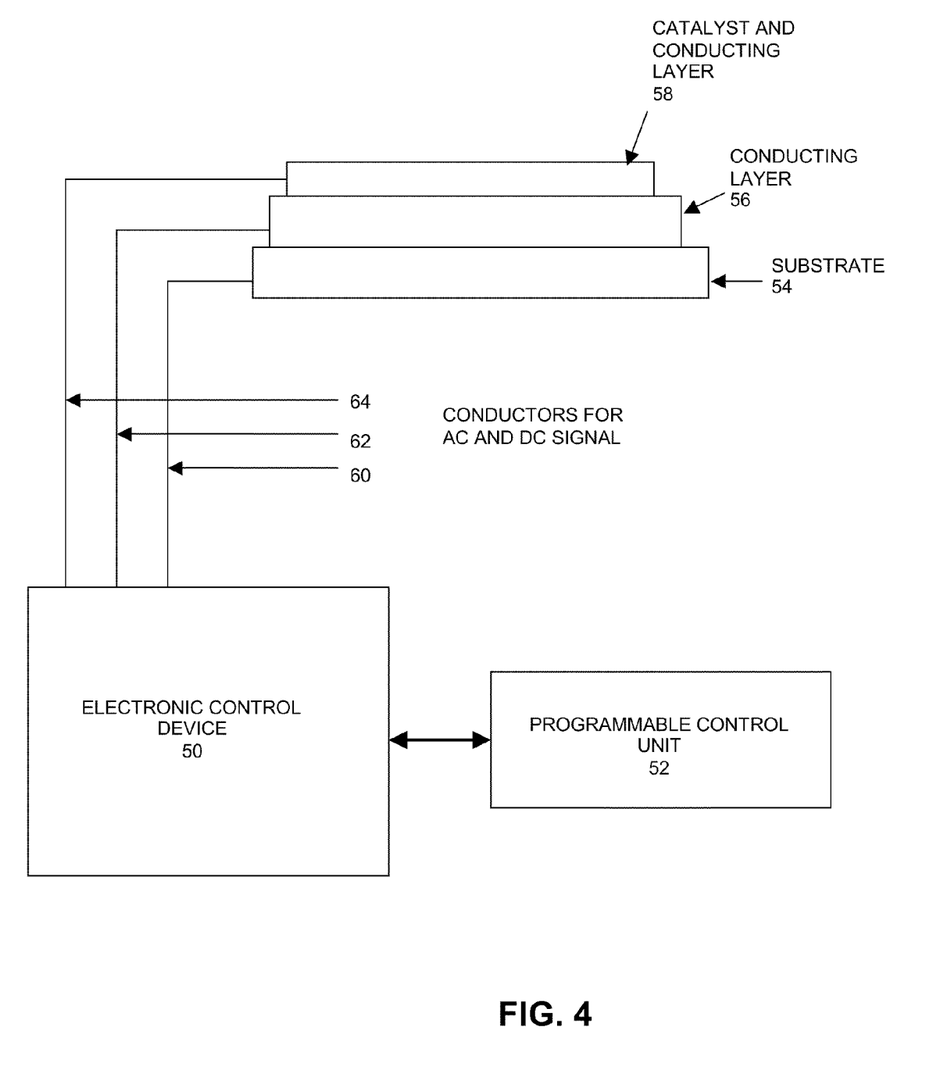
FIG. 4 shows a block diagram of a further example embodiment of the present invention.

FIG. 4 shows an alternate embodiment of a structure for implementing the DECAN process in accordance with the present invention. It should be noted that while certain of the layers 54, 56, and 58 shown in FIG. 4 are required to reduce to practice the DECAN process in accordance with the present invention, not all of them are necessary. For example, at least two of these layers must be present. The remaining layer may be present or not, depending on the application of the invention or desired results.

FIG. 4 shows an electronic control device 50 capable of sending low amplitude AC signals (in the frequency range 1 Hz to 500 kHz), and, simultaneously, DC signals (at voltages between +2 V and −2 V), as well as low frequency (below 1 Hz), variable current and voltage. The operation of this electronic control device may be controlled by an externally programmable control unit 52. The details of the software governing the operation of this programmable control unit are not the focus of the present invention.

An underlying electronic conductor 54 may be provided having an electrically contiguous/continuous phase. This material can be deposited on a sustaining insulating substrate, one example of which is cordierite. Other existing materials, or materials to be developed, having these properties may also be used with the present invention. Alternatively, this material can be a metallic member (a corrugated structure, a stack of sieves or any other structure with open, percolating channels, tortuous or not).

An electrically contiguous/continuous layer 56 of an ionic conductor (which may be any cationic or anionic material; such as Nafion-like materials, stabilized zirconia, and others as is known in the art) may also be provided. This layer 56 can be deposited by washcoat-like techniques, by CVD, by plasma-spraying, by electrophoresis, and or any other suitable process leading to a thin film of catalyst deposited on the conducting or semi-conducting substrate 54.

An electrically contiguous/continuous layer 58 of an electronic or ionic conductor (different from that of the previous layer 54 or 56) may also be provided. The ionic conductor of layer 58 may be any cation or anion-conducting material; such as Nafion-like materials, stabilized zirconia, and others as is known in the art). The electronic conductor can be a carbide, a doped oxide, doped silicon or any other conducting or semiconducting material, single-phase or mixed-phase. This layer 58 may be deposited on top of the previous layer (either layer 54 or 56) by any of the techniques discussed above. The catalyst, as fine particles, is included in this layer 58, which comes in contact with the phase carrying the substance(s) whose reaction is to be catalyzed. Alternately, the catalyst can be deposited on the surface of this layer 58 which is exposed to the phase carrying the substance(s) whose reaction is to be catalyzed.

If the substrate of layer 54 is an electronic conductor (i.e., a metal), the layer 56 is not necessary, but may be present or useful in certain applications of the present invention.

Conductors/electrodes 60, 62, and 64 may be provided for supplying the AC and DC current from the control device 50 to the layers 54, 56, and 58, respectively.

In the example embodiment shown in FIG. 4, current/voltage are applied between the layers 54, 56, and 58 in a three-terminal configuration, in a manner consistent with that described above in connection with FIG. 3.

It should be appreciated that FIG. 4 shows three layers 54, 56, and 58 while FIG. 3 shows only an electroconductive support 12 and a catalyst layer 14. Further, it should be appreciated that the control device 50 and programmable control unit 52 of FIG. 4 are equivalent to the control unit 32 of FIG. 3. The remaining elements of FIG. 3, such as, for example, the polarization impedance measuring unit 26, the current control unit 28, AC sensors 16, the heater 36, the heater control unit 34, and interface 30, may also be used with the structure shown in FIG. 4 to the same or nearly the same effect. In fact, where the substrate of layer 54 of FIG. 4 is an electronic conductor and layer 56 is not used, the FIG. 4 embodiment becomes substantially similar to that of FIG. 3.

In an example embodiment of the present invention, an asymmetrical alternating current may be provided to the catalyst layer 58 (e.g., via conductor 64). The polarization impedance of the catalyst layer may be monitored (e.g., by polarization impedance measuring unit 26 as discussed above in connection with FIG. 3). The polarization impedance may be controlled by varying the asymmetrical alternating current supplied to the catalyst layer 58 (e.g., by control unit 50). The control processes discloses in U.S. patent application Ser. No. 10/423,376 (i.e., controlling the catalytic enhancement via the values of the polarization impedance $R_p$ (ohm)) can be applied to the oxidation of soot generated by the operation of a diesel engine, or from incomplete combustion in a coal-operated heating installation (e.g., in a power plant). As used herein the term "asymmetrical alternating current" is defined to mean an alternating current whose amplitude of the positive part of the cycle (voltage or current) is different from the amplitude of the negative part of the cycle (voltage or current), and can be defined by its asymmetry factor. The asymmetry factor is the ratio of the larger amplitude of the cycle to the smaller amplitude of the cycle. The role of the asymmetrical alternating current is to displace the migration of the interfacial charged species to/or away from the interface at the time scales determined by the (variable) frequency of the asymmetrical alternating current.

In accordance with an example embodiment of the present invention, soot that has built up on the catalyst layer may be eliminated. In particular, in such an example embodiment, carbon may be eliminated by forcing its oxidation through pumping oxygen from a substrate under DECAN conditions, or favoring the oxidation reaction under steam reforming conditions, in an excess of water. Sensing of the onset of soot deposition can be accomplished via examination of the matrix of values of the interfacial impedance: such as, for example, the patterns of the change of the phase angle and of the polarization resistance, which tend to become indeterminate and scattered. The onset of this scattering accompanies the onset of the carbon (soot) deposition, and can be used as a trigger for the application of an example embodiment of a soot oxidation scheme in accordance with the present invention.

Thus, in accordance with example embodiments of the present invention, oxygen may be provided the catalyst layer 58 to generate an oxidation reaction for eliminating carbon particles from the catalyst layer 58. Alternatively or additionally thereto, one of water and steam may be provided to the catalyst layer 58 to enhance the oxidation reaction.

The catalyst layer 58 (together with layers 56 and/or layer 54) may be applied to a catalytic reactor. The catalytic reactor may be built around a filter which retains the carbon particles. The deposition of the carbon particles on the catalyst layer 58 may be monitored. The monitoring of the deposition of the carbon particles may comprise monitoring at least one parameter which describes an interfacial impedance of the catalyst layer 58 and determining an amount of the carbon particles deposited on the catalyst layer as a function of values of the at least one monitored parameter. For example, the at least one monitored parameter may comprise at least one of the monitored polarization impedance and a phase angle of the interfacial impedance.

Catalyst regeneration may also be achieved in accordance with an example embodiment of the present invention by utilizing a matrix of current and voltage fluctuations, simultaneous (optionally) with a heating profile, which may all be monitored via the measurement of the $R_p$ and phase angle distribution. The effectiveness of the catalyst regeneration is evaluated by the value of the $R_p$ (which has to return to a value as close as possible to the value range characterizing the fresh, unused catalytic system) and the phase angle distribution (the phase angle has to be as close to zero as possible). In other words, the polarization impedance will have a very low capacitive component; for example, phase angle values between −5 degrees and +5 degrees will be considered appropriate for catalyst regeneration within the scope of the present invention Additional factors assisting in the regeneration of the catalyst may be water vapor injection and the monitored variation of the partial pressure of oxygen in the carrier gas. Such variations in the partial pressure of oxygen can be achieved by methods well known in the prior art.

Thus, in accordance with example embodiments of the present invention, at least one of an amplitude and a phase of the asymmetrical alternating current may be varied (e.g., by control unit 50) in order to regenerate the catalyst layer 58. For example, the at least one of the amplitude and the phase of the asymmetrical alternating current may be varied to bring the polarization impedance to a value within a predetermined range of values when the polarization impedance value falls outside of this predetermined range. This predetermined range may be a range of values around an original polarization impedance value of the catalyst layer 58 prior to use.

Further, the at least one of the amplitude and the phase of the asymmetrical alternating current may be varied to achieve a phase angle of an interfacial impedance of the catalyst layer 58 which is within a range of between approximately −5 degrees and +5 degrees.

In another example embodiment of the present invention, the application of at least one of water, oxygen, and heat to the catalyst layer 58 may be controlled to enhance the regeneration of the catalyst layer 58.

Further, a partial pressure of oxygen in a carrier gas applied to the catalyst layer 58 may be controlled (varied) in order to enhance the regeneration of the catalyst layer 58.

An alternate example embodiment of the present provides a further method for controlling a catalytic process. In such an example embodiment, monitoring a polarization impedance of the catalyst layer 58 is monitored (e.g., using polarization impedance measuring unit 26). Additionally, at least one of an amount of water and an amount of oxygen applied to the catalyst layer may be controlled.

In such an example embodiment, an alternating current may be applied to the catalyst layer 58 and the polarization impedance may be controlled by varying the alternating current.

The method may further comprise varying at least one of a phase and an amplitude of the alternating current and/or controlling the at least one of the amount of the water and the amount of the oxygen applied to the catalyst layer 58 to provide at least one of oxidation of carbon particles on the catalyst layer and regeneration of the catalyst layer 58.

In addition, an amount of heat applied to the catalyst layer may be controlled in order to further control the regeneration of the catalyst. The heat may be applied using heater 36 controlled by heater control unit 34 (shown in FIG. 3), which may be responsive to control signals from control unit 50.

The amount of the oxygen may be controlled by varying a partial pressure of oxygen in a carrier gas applied to the catalyst layer 58.

The deposition of the carbon particles on the catalyst layer 58 may be monitored. The monitoring of the deposition of the carbon particles may comprise monitoring at least one parameter which describes an interfacial impedance of the catalyst layer 58 and determining an amount of the carbon particles deposited on the catalyst layer as a function of values of the at least one monitored parameter. For example, the at least one monitored parameter may comprise at least one of the monitored polarization impedance and a phase angle of the interfacial impedance.

In a further example embodiment of the present invention, the water may be heated to generate steam. In such an example embodiment, the controlling of the amount of the water applied to the catalyst layer 58 comprises controlling an amount of steam applied to the catalyst layer.

When regenerating the catalyst 58, the at least one of the amplitude and the phase of the alternating current may be varied to return the polarization impedance to a value within a predetermined range of values when the polarization impedance value falls outside of this predetermined range. The predetermined range may be a range of values around an original polarization impedance value of the catalyst layer 58 prior to use.

In addition, when regenerating the catalyst 58, the at least one of the amplitude and the phase of the asymmetrical alternating current may be varied to achieve a phase angle of an interfacial impedance of the catalyst layer which is within a range of between approximately −5 degrees and +5 degrees.

In one example embodiment, the alternating current may comprise an asymmetrical alternating current.

The catalyst layer 58 may be applied to a catalytic reactor. The catalytic reactor may comprise a filter which retains the carbon particles. If the catalytic reactor is built as a filter, this will make sure that the carbon-based particles are retained by the filter, and approximately 98-99 mass % of the soot can be oxidized to CO2.

The controlling of the at least one of the amount of water and the amount of oxygen applied to the catalyst layer 58 may comprise controlling an amount of steam applied to the catalyst layer. The steam may be wet steam or dry steam, depending on the particular application.

The controlling of the amount of the oxygen applied to the catalyst layer 58 may comprise controlling environmental oxygen levels present in the exhaust stream, for example by controlling an amount of water or steam injected into the exhaust stream.

A local sensing function is provided in accordance with an example embodiment of present invention, which senses the matrix above, including the values of $R_p$ and phase angle distribution (e.g., using polarization impedance measuring unit 26). The matrix is correlated with the gas composition (for instance, the amounts of NOx, CO and other components) and its variations. Brief ($10^{-4}$–1 second) step functions of applied current/voltage between the working electrode (e.g., electrode 64 of the catalyst 58 in FIG. 4) and the auxiliary electrode (e.g., electrode 60 or electrode 62), followed by a Fast Fourier Transform (FFT) analysis of the pattern of the response of the polarized catalytic interface measured between the working and the reference electrodes, provide a unique fingerprint, that can be assigned to a specific composition of the phase in contact with the catalyst. These compositional changes can be relayed to the central computer that controls the operation of the engine (i.e., an engine ECU), for the real-time adjustment of the parameters controlling the operation of the engine: ignition parameters, valve timing, and the like. This application is not limited to the operation of Otto or Diesel engines; the operation of turbine engines can be controlled as well in accordance with the composition of the exhaust gases.

This application does not require a separate sensor. The sensing function is performed by the hardware and the software described above and shown in FIGS. 3 and 4 (e.g., electronic control device 50, polarization impedance measuring unit 26).

With an example embodiment of the present invention, the functionality of, for example, systems including multiple phase and/or multi-functional catalysts, can be achieved by a system using only a single-phase catalyst (built as described in connection with FIG. 4 above), but on electrically separated substrates. Each electrically independent section of a stack can be polarized differently, and can thus be controlled to perform different functions (e.g., reduction of NOx in one section, oxidation of carbon monoxide to carbon dioxide in another section, or oxidation of unreacted hydrocarbons in a third section).

Therefore, the same material can perform different functions in different areas of the catalytic reactor. This functionality can be combined with the sensing functions described in above. The externally programmable control unit 52 (FIG. 4) can effect variations in functionality from one area to another, as required.

Figure 5A:
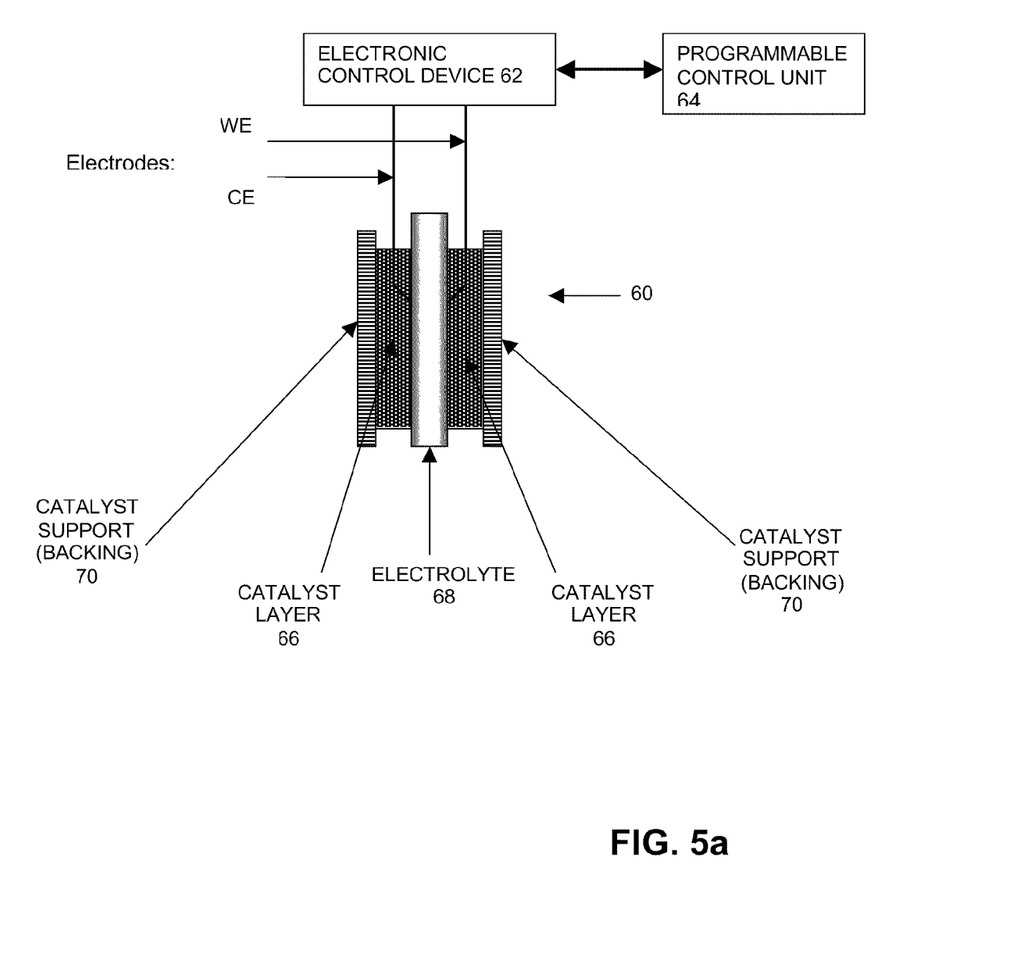
Figure 5B:
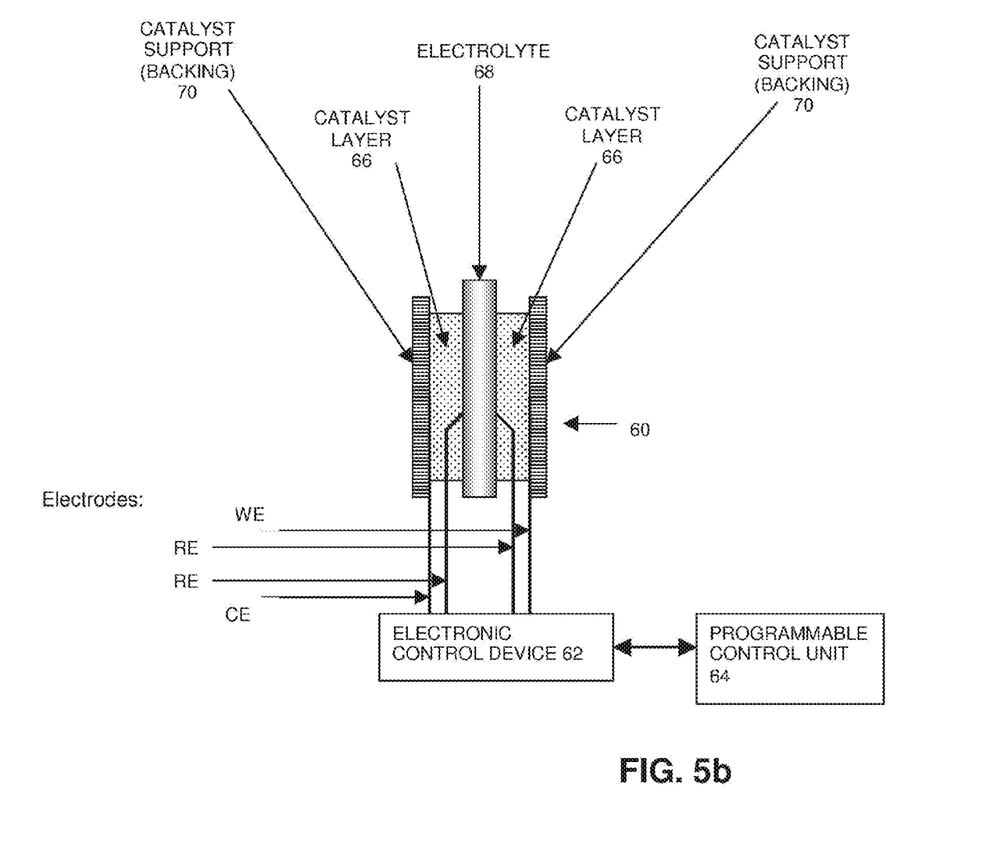

The control methods discussed above can also be applied to control of the operation of fuel cells. Example embodiments of the present invention for controlling fuel cells in accordance with the present invention is shown in FIGS. 5a and 5b. It is known that the current generated by a fuel cell 60 is maximized when the mass and charge transfer across the MEA (membrane-electrode assembly) is maximized. The polarization resistance is minimized under these conditions. The fuel cell 60 of FIGS. 5a and 5b is shown as having an two catalyst layers 66, an electrolyte layer 68 therebetween, and a respective catalyst support 70.

In accordance with an example embodiment the present invention, for a maximum yield, a fuel cell 60 must be driven (any fuel cell type is included here) towards an operation scheme driven by the criterion of minimizing the $R_p$ and achieving a narrow phase angle distribution, as close as possible to zero. FIG. 5a shows an example embodiment of the present invention where the measurements and control of the fuel cell are carried out using a two electrode configuration (catalyst-to-catalyst layer) with a working electrode, WE and counter-electrode, CE. FIG. 5b shows an alternate embodiment of the present invention utilizing a four electrode configuration with two electrodes for each compartment, one electrode CE connected to the catalyst layer, and the other electrode RE connected to the surface of the electrolyte membrane in direct contact with the environment of the respective compartment of the fuel cell.

In both of the above-described example embodiments, the signals from electrodes CE and RE are measured by an Electronic Control Device 62 similar in function with that described above in connection with FIGS. 3 and 4. The processing of the signal and the commands for driving the operation of the fuel cell are functions which may be performed by a Control Unit 64 similar in function with that described above in connection with FIG. 4.

It should now be appreciated that the present invention provides advantageous methods and apparatus for controlling catalytic processes, including soot elimination and catalysts regeneration.

Although the invention has been described in connection with various illustrated embodiments, numerous modifications and adaptations may be made thereto without departing from the spirit and scope of the invention as set forth in the claims.

What is claimed is:

1. A method for controlling a catalytic process, comprising:
    monitoring a polarization impedance of a catalyst layer;
    controlling at least one of an amount of water and an amount of oxygen applied to the catalyst layer;
    providing an alternating current to the catalyst layer;
    controlling the polarization impedance by varying the alternating current; and
    varying at least one of a phase and an amplitude of the alternating current and controlling the at least one of the amount of the water and the amount of the oxygen applied to the catalyst layer to provide at least one of oxidation of carbon particles on the catalyst layer and regeneration of the catalyst layer.

2. A method in accordance with claim 1, further comprising:
    controlling an amount of heat applied to the catalyst layer in order to further control the regeneration of the catalyst.

3. A method in accordance with claim 1, wherein:
    the amount of the oxygen is controlled by varying a partial pressure of oxygen in a carrier gas applied to the catalyst layer.

4. A method in accordance with claim 1, further comprising:
    monitoring deposition of the carbon particles on the catalyst layer.

5. A method in accordance with claim 4, wherein the monitoring of the deposition of the carbon particles comprises:
monitoring at least one parameter which describes an interfacial impedance of the catalyst layer; and
determining an amount of the carbon particles deposited on the catalyst layer as a function of values of the at least one monitored parameter.

6. A method in accordance with claim 5, wherein:
the at least one monitored parameter comprises at least one of the monitored polarization impedance and a phase angle of the interfacial impedance.

7. A method in accordance with claim 1, wherein:
the water is heated to generate steam; and
controlling of the amount of the water comprises controlling an amount of steam applied to the catalyst layer.

8. A method in accordance with claim 1, wherein:
when regenerating the catalyst, the at least one of the amplitude and the phase of the alternating current is varied to return the polarization impedance to a value within a predetermined range of values when the polarization impedance value falls outside of said range.

9. A method in accordance with claim 8, wherein:
the predetermined range is a range of values around an original polarization impedance value of the catalyst layer prior to use.

10. A method in accordance with claim 1, wherein:
when regenerating the catalyst, the at least one of the amplitude and the phase of the asymmetrical alternating current is varied to achieve a phase angle of an interfacial impedance of the catalyst layer which is within a range of between approximately −5 degrees and +5 degrees.

11. A method in accordance with claim 1, wherein:
the alternating current comprises an asymmetrical alternating current.

12. A method in accordance with claim 1, wherein:
the catalyst layer is applied to a catalytic reactor; and
the catalytic reactor comprises a filter which retains the carbon particles.

13. A method in accordance with claim 1, wherein:
said controlling of said at least one of the amount of water and the amount of oxygen applied to the catalyst layer comprises controlling an amount of steam applied to the catalyst layer.

14. A method in accordance with claim 1, wherein:
said controlling of the amount of the oxygen applied to the catalyst layer comprises controlling environmental oxygen levels present in said exhaust stream.

* * * * *